United States Patent [19]

Keller et al.

[11] 4,234,712
[45] Nov. 18, 1980

[54] POLYPHTHALOCYANINE RESINS

[75] Inventors: Teddy M. Keller, Alexandria, Va.; James R. Griffith, Riverdale Heights, Md.

[73] Assignee: The United States of America as represented by the Secretary of the Navy, Washington, D.C.

[21] Appl. No.: 75,631

[22] Filed: Sep. 14, 1979

[51] Int. Cl.³ ............................................. C08G 73/00
[52] U.S. Cl. .................... 528/9; 260/465 D; 260/465 E; 528/125; 528/166; 528/172; 528/173; 528/206; 528/210; 528/271
[58] Field of Search ................ 528/9, 172, 166, 206, 528/210, 271, 173, 125; 260/465 D, 465 E

[56] References Cited

U.S. PATENT DOCUMENTS

| | | | |
|---|---|---|---|
| 3,926,629 | 12/1975 | Weig | 528/9 |
| 4,056,560 | 11/1977 | Griffith et al. | 260/465 D |
| 4,057,567 | 11/1977 | Griffith et al. | 260/465 E |
| 4,136,107 | 1/1978 | Griffith et al. | 260/465 E |

OTHER PUBLICATIONS

Hackh's Chemical Dictionary, pp. x and xi.

"The Chemistry of Synthetic Dyes", vol. 5, pp. 249, 279–280.

*Primary Examiner*—Lester L. Lee
*Attorney, Agent, or Firm*—R. S. Sciascia; Philip Schneider; Thomas McDonnell

[57] ABSTRACT

Polyphthalocyanine resins are obtained by heating one or more bisorthodinitriles of the general formula:

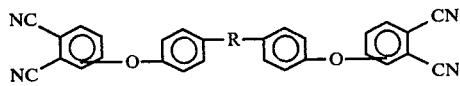

wherein R represents

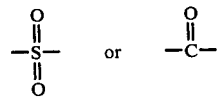

at temperature at or above the melting point thereof. The resins are useful in high-temperature structural composites and adhesives.

6 Claims, No Drawings

POLYPHTHALOCYANINE RESINS

BACKGROUND OF THE INVENTION

The present invention pertains generally to high-temperature resins and in particular to cyano-addition resins from oxyarylbisorthodinitriles.

It is known that certain bisorthodinitriles polymerize to form strong, high-temperature thermosetting resins. Examples of bisorthodinitriles suitable for producing these resins are disclosed in U.S. Pat. Nos. 4,056,560; 4,057,569; 4,116,945; and 4,136,107 by James R. Griffith amd Jacque G. O'Rear.

The structure of these resins is not completely known. For the following reasons, the principal mechanism of formation is theorized to be phthalocyanine nucleation. As the bisorthodinitriles polymerize, the color becomes progressively darker green in the manner similar to phthalocyanines. The polymerization is difficult to initiate and promote which indicates the formation of a large and complex nucleus such as the phthalocyanine nucleus by a charge end group such as the phthalonitrile group.

The resins have properties that make them exceptionally suitable for structural resins. They have a structural strength comparable to that of epoxy and polyimide resins and have many advantages over these resins. They have a maximum temperature stability in an oxygen-containing atmosphere of about 230° C. which represents a significant improvement over epoxy resins and their water resistance, as measured by the water-soak method, is better than that for epoxy resins. These resins have many advantages over polyimides due to the absence of solvents, being less hydroscopic, and not being thermoplastic with a low glass transition temperature. Thus, polyphthalocyanine resins promise to be an important new class of structural resins.

Much interest has been shown in improving the adhesive strength of polyphthalocyanine resins in order to obtain an adhesive with the exceptional properties of polyphthalocyanines and to improve the toughness of polyphthalocyanine composites.

SUMMARY OF THE INVENTION

It is, therefore, an object of the present invention to provide a polyphthalocyanine resin having a water repellancy greater than existing polyphthalocyanine resins without fluorine atoms.

Another object is to provide a resin which is thermally stable in an oxidative atmosphere at a temperature up to about 300° C.

Another object of this invention is to provide a resin which is self-extinguishing and gives a high char yield upon burning.

Yet another object of this invention is to provide a resin which is more resistant to oxidative attack than epoxies and polyphthalocyanine resins prepared from amide-bridged bisorthodinitriles.

A still further object of this invention is to obtain a polyphthalocyanine resin with greater adhesive strength.

These and other objects are achieved by heating a bisorthodinitrile having phenoxy and carbonyl or sulfonyl moieties in the bridge in order to effect a polymerization by a cyclic addition reaction without forming volatile by-products and thereby forming a solid, void-free product.

DETAILED DESCRIPTION OF THE INVENTION

The bisorthodinitriles which are heated to form the polyphthalocyanine resins of the present invention have the general formula:

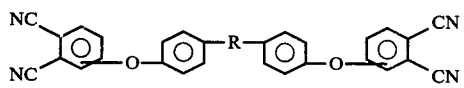

where R is

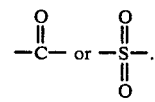

The polymerization of these bisorthodinitriles is believed to be a phthalocyanine formation for following reason. As the resins of this invention are formed, the green color becomes progressively darker in the same manner as phthalocyanines and polyphthalocyanines do. Other cyano-addition reactions may also be present; however, the resulting resin is a three-dimensional network polymer with exceptional uniformity in properties.

The resin with phthalocyanine nuclei has a structural formula:

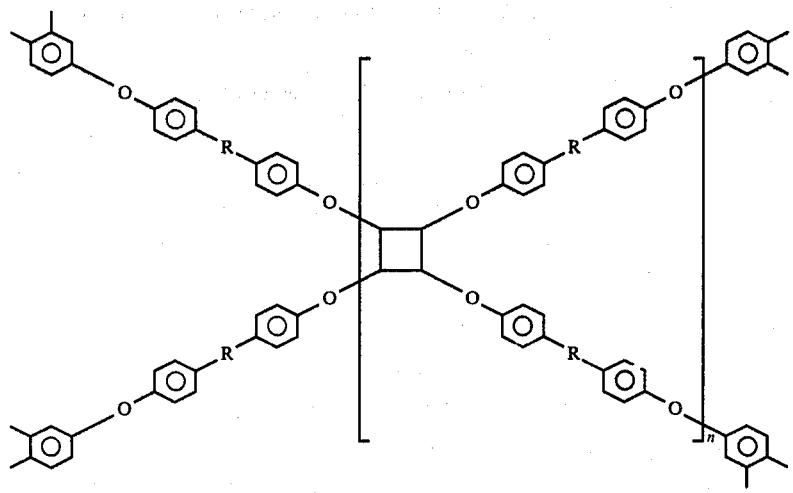

where n is any number, R is either

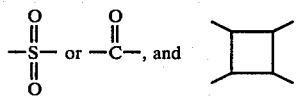

represents a phthalocyanine nucleus which has the formula:

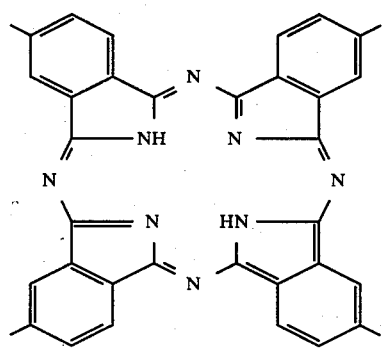

If the phthalocyanine has been coordinated by a metal or salt, the phthalocyanine nucleus is represented by

and the formula is:

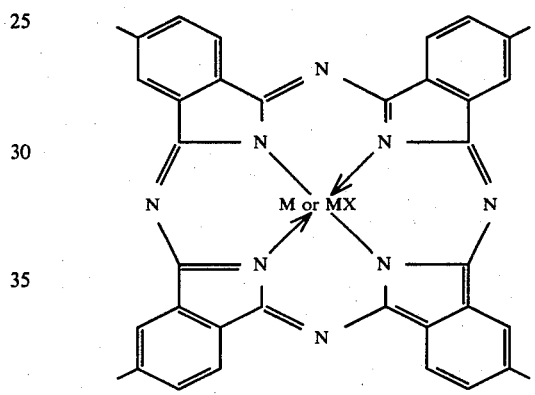

wherein M is a metal and MX is a metallic salt. Hereinafter, the resins of this invention are designated as: $(PcO_4R_2Ph_4)_n$ if neat, as $(M.PcO_4R_2Ph_4)_n$ if coordinated with a metal, and as $(MX.PcO_4R_2Ph_4)_n$ if coordinated with a metallic salt.

The preferred metals are copper, iron, zinc, and nickel on account of their enhancement of thermal stability over other metals at temperatures in excess of 250° C. Examples of other metals which may be used are chromium, molybdenum, vanadium, beryllium, silver, mercury, tin, lead, antimony, calcium, barium, manganese, magnesium, cobalt, palladium and platinum. The preferred metallic salt is stannous chloride. This salt increases the reaction rate more than metals or other salts and has the least trouble with poor dispersion and voids caused by entrapped gas. These advantages occur only if the stannous chloride is dispersed by the method described hereinafter. Other suitable metallic salts include cuprous bromide, cuprous cyanide, cuprous ferricyanide, zinc chloride, zinc bromide, zinc iodide, zinc ferrocyanide, zinc acetate, zinc sulfide, silver chloride, ferrous chloride, ferric chloride, ferrous ferricyanide, ferrous chloroplatinate, ferrous fluoride, ferrous sulfate, cobaltous chloride, cobaltic sulfate, cobaltous cyanide, nickel chloride, nickel cyanide, nickel sulfate, nickel carbonate, stannic chloride, stannous chloride hydrate, a complex of triphenylphosphine oxide and mixtures thereof. Additional examples of metals and salts are found in Mosher, Frank H. and Thomas, Arthur L. *Phthalocyanine* Compounds, N.Y. Reinhold, 1963, pp. 104-41.

The present bisorthodinitriles can polymerizes to the polyphthalocyanines of the subject invention at their melting point, but the reaction is slow. Consequently, it is preferred that the bisorthodinitriles are heated to about 15° C. above their melting points in order to have the polymerization completed within a reasonable time. The atmosphere can be oxygen-containing, inert, or a vacuum. The heating is continued until the melt solidifies to an extremely hard material. The preferred method of preparation comprises heating a phthalonitrile to a temperature from about 15° to 20° C. above the melting point thereof until the visosity of the melt begins to increase due to the onset of phthalocyanine formation which is called the B-stage. At the B-stage, the material can be cooled to a frangible solid and can be stored indefinitely without further reaction. The C-stage is obtained from the B-stage resin by melting the resin and heating the resin at a temperature from about 25° C. above the melting point thereof to about the decomposition temperature of the resulting resin. The B-stage resin can also be broken up, processed into a desired formed, and then heated in the above manner. The preferred temperature range for obtaining the C-stage resin is from about 25° C. above the melting point to about the decomposition temperature. The optimum cure for any particular resin at a particular temperature is determined empirically by testing the structural strength of samples over a range of cure times.

In adding a metal or salt to co-ordinate the phthalocyanine nuclei, the metal or salt is added in a stoichiometric amount while the bisorthodinitrile is molten or powdered. If the amount of the metal or salt is less than stoichiometric, i.e., less than one equivalent per two equivalents of the phthalonitrile monomer, the resulting resin is not completely coordinated with a salt or metal. An amount in excess of stoichiometry would cause the resin to have unreacted metal or salt in it. Avoiding the presence of any unreacted salt or metal is particularly important with the synthesis of the present resins on account of the high temperature needed for polymerization.

High temperatures further require a high degree of purity on account of the increased reactivity of all species present including the impurities. For example, metal oxides at temperatures above 280° C. can attack the benzene-ring structure. The preferred amounts of impurities are less than 100 ppm. Impurities can be present in amounts up to 300 ppm without noticeably affecting the quality of the final resin.

As with previous polyphthalocyanine resins, the dispersion of the salt ot metal is affected by the particle size. Since the resin is formed at such high temperatures, dispersion becomes particularly critical. Consequently, particle sizes up to 100 micrometers are preferred.

If stannous chloride is used to co-ordinate the resin, the stannous chloride must be introduced into the melt as stannous chloride dihydrate by the following method. The stannous chloride dihydrate ($SnCl_2.2H_2O$) is introduced either as a melt or powder. If the bisorthodinitrile is a powder, the mixture is heated, while being stirred, to a temperature from the melting point to about 20° C. in excess thereof until all water is expelled from the mixture; and if the phthalonitrile is molten, then the mixture is kept at the melt temperature until all water is expelled. The mixture is then reacted either to the B-stage or C-stage in the manner previously described.

The effect of including a metal or salt is the promotion of the polymerization. Inclusion of a salt or metal permits a large reduction in the polymerization temperatures without greatly affecting the reaction rate or causes the reaction to significantly speed up at any given temperature. This promotion effect is especially present with the inclusion of stannous chloride. With that salt, the polymerization can occur at the melting point of the bisorthodinitrile with an extremely fast polymerization rate.

The bisorthodinitriles used to produce the polyphthalocyanines of this invention are prepared by a nucleophilic substitution of the nitrosubstituent, which has been activated by cyano groups on the aromatic ring of 4-nitrophthalonitrile with a bisphenol. The reaction is shown by the following schematic:

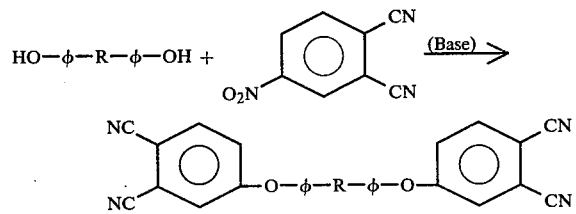

wherein R represents

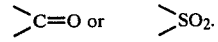

Examples of the preparation of the bisorthodinitriles and polyphthalocyanines of the invention are herein given. These examples are given by way of explanation and are not meant to limit the disclosure or the claims to follow in any manner.

EXAMPLE 1

Synthesis of Bis(3,4-Dicyanophenyl) Ether of Bisphenol S

A mixture of 51 g (0.2 mol) of bisphenol S, 16.4 g (0.4 mol) of 50% aqueous sodium hydroxide, 450 ml of dimethyl sulfoxide and 100 ml of benzene was stirred at reflux for 6 hours. The water and benzene were removed with a Dean-Stark trap. The reaction content was cooled to room temperature and 69.4 g (0.4 mol) of 4-nitrophthalonitrile was added in one sum. The resulting mixture was stirred for 12 hours at room temperature under a nitrogen atmosphere and then poured into 1500 ml of cold water. The slightly colored solid which separated was collected by suction filtration, washed with water and dried. The product was then washed with 400 ml of hot ethanol to afford 99 g (98%) of product, m.p. 231°-233° C.

A second mixture containing 5.1 g (0.02) of bisphenol S, 10.2 g (0.04 mol) of 4-nitrophthalonitrile, 10.1 g (0.08 mol) of anhydrous potassium carbonate and 40 ml of dry dimethyl sulfoxide was stirred under a nitrogen atmosphere at 70°-80° C. for 6 hours. The cooled product mixture was poured into 300 ml of cold dilute hydrochloric acid. The slightly colored crystalline material was collected by suction filtration and washed with water until the filtrate was neutral. Recrystallization from acetonitrile afforded 8.7 (85%) of the desired product, m.p. 230°–233° C.

EXAMPLE 2

Synthesis of Bis(3,4-Dicyanophenyl) Ester of 4,4'-Dihydroxybenzophenone.

A mixture containing 3.0 g (0.014 mol) of 4,4'-dihydroxybenzophenone, 1.2 g (0.03 mol) of 50% aqueous sodium hydroxide solution, 25 ml of dimethyl sulfoxide and 25 ml of benzene was heated at reflux for 12 hours under a nitrogen atmosphere. The water and then the benzene were removed by a Dean-Stark trap. To the cooled reaction content was added 4.8 g (0.028 mol) of 4-nitrophthalonitrile, and the resulting black mixture was stirred at room temperature for 18 hours. The product mixture was then poured into 150 ml of water. The white solid which separated was collected by suction filtration. The crude product was washed with hot ethanol to afford 6.1 g (94%) of product, m.p. 216°–218° C.

EXAMPLE 3

Polymerization of Bis(3,4-Dicyanophenyl) Ether of Bisphenol S.

Samples (1–2 g) of the monomer were placed in planchets and heated at 280° C. for 4 days. Gelation had occurred after 24 hours and the sample was postcured 3 additional days to toughen the polymer. The cured polyphthalocyanine was bonded to an aluminum planchet. Additional samples of cured polymers were isolated by spraying other planchets with an anti-sticking reagent.

Another sample (1.5 g, 0.003 mol) of the monomer and a stoichiometric amount (0.32 g, 0.0014 mol) of stannous chloride dihydrate was heated at 240° C. for 24 hours. After the monomer melted, the sample quickly turned green along with an immediate dissolution of the salt. The viscosity increased rapidly with gelation occurring in 5 minutes.

EXAMPLE 4

Polymerization of Bis(3,4-Dicyanophenyl) Ester of 4,4'-Dihydroxybenzophenone.

A sample (0.4 g) of the monomer was placed in a small test tube and heated at 280° C. for 36 hours. Gelation had occurred after 18 hours. Upon slowly cooling, the polymer contracted and the wall of the test tube shattered due to the adhesion of the polymer with the glass.

Another sample (0.6 g, 0.0013 mol) of the monomer and a stoichiometric amount (0.13 g, 0.0006 col) of stannous chloride dihydrate were thoroughly mixed, placed in a test tube and heated at 225° C. for 36 hours. The monomer melted at 215°–220° C., and the salt dissolved almost immediately at this temperature. Gelation had occurred after 10 minutes. The polymer again adhered to the wall of the test tube as determined by its breakage on cooling.

Samples prepared by methods similar to Examples 3 and 4 showed high thermal and oxidative stability when heated at 280° C. for over 100 days in air. After 75 days of continuous heating, the weight loss was about two percent of the original total weight. Exposure and removal of samples of these polymers from a high temperature flame demonstrated that these polymers are self-extinguishing.

Other samples prepared by methods similar to Examples 3 and 4 were tested by the water-soak test which comprises submerging a sample in water and periodically weighting the sample. Both polyphthalocyanines which contain polar moieties, e.g., $SO_2$, CO, showed a maximum water absorptivity of 3.5 weight percent which occurred after 66 days. In contrast, amide-bridged polyphthalocyanines have a maximum water absorptivity of slightly over 6 percent, and epoxies have a maximum water absorptivity of at least 10 percent.

As these tests domonstrate, the resins of this invention with a bridge having a polar and phenoxy moieties have exceptional thermal and oxidative stability along with a low water absorptivity.

Another important feature of these polymers compared to the other polyphthalocyanines is their enhanced adhesive properties (see Examples 3 and 4). This phenomenon is apparently attributed to the polar moieties on the linking structure between the phthalocyanine nuclei.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A thermosetting resin which comprises a polyphthalocyanine having recurring units of the general formula selected from the class consisting of $(PcO_4R_2Ph_4)$ $(M.PcO_4R_2Ph_4)$ and $(MXPcO_4R_2Ph_4)$ wherein Pc represents the phthalocyanine nucleus having the formula:

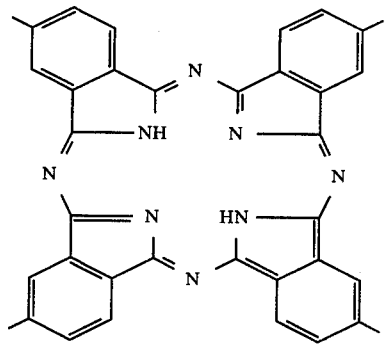

Ph represents the phenyl group, M is selected from the class consisting of chromium, molybdenum, vanadium, beryllium, silver, mercury, aluminum, tin, lead, antimony, calcium, barium, manganese, magnesium, zinc, copper, iron, cobalt, nickel, palladium, platinum, and mixtures thereof, MX is selected from cuprous chloride, cuprous bromide, cuprous cyanide, cuprous ferricyanide, zinc chloride, zinc bromide, zinc iodide, zinc cyanide, zinc ferrocyanide, zinc acetate, zinc sulfide, silver chloride, ferrous chloride, ferric chloride, ferrous ferricyanide, ferrous chloroplatinate, ferrous fluoride, ferrous sulfate, cobaltous chloride, cobaltic sulfate, cobaltous cyanide, nickel chloride, nickel cyanide, nickel sulfate, nickel carbonate, stannic chloride, stannous chloride hydrate, a complex of triphanylphosphine oxide and stannous chloride and mixtures thereof, and R is selected from the class consisting of

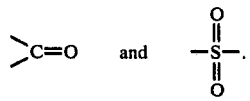

2. The resin of claim 1 wherein said polyphthalocyanine repeating unit is $(M \cdot PcO_4R_2Ph_4)$.

3. The resin of claim 2 wherein M is selected from the class of copper, iron, zinc, and nickel.

4. The resin of claim 1 wherein said polyphthalocyanine repeating unit is $(MX \cdot PcO_4R_2Ph_4)$.

5. The resin of claim 4 wherein MX is stannous chloride.

6. The resin of claim 1 wherein said polyphthalocyanine repeating unit is $(PcO_4R_2Ph_4)$.

* * * * *